United States Patent

Tanaka

[11] Patent Number: 5,861,913
[45] Date of Patent: Jan. 19, 1999

[54] HEAT-SENSITIVE INFRARED-LIGHT IMAGE SENSOR WITH CIRCUITRY FOR CANCELING TEMPERATURE-DEPENDENT DRIFT COMPONENTS

[75] Inventor: Akio Tanaka, Tokyo, Japan

[73] Assignee: NEC Corporation, Tokyo, Japan

[21] Appl. No.: 764,883

[22] Filed: Dec. 16, 1996

[30] Foreign Application Priority Data

Dec. 15, 1995 [JP] Japan .................................. 7-327732

[51] Int. Cl.$^6$ ............................................. H04N 5/33
[52] U.S. Cl. ........................... 348/164; 348/247; 348/244
[58] Field of Search .................................. 348/164, 247, 348/249, 246, 244, 241, 165, 166, 700, 701; 382/275; H04N 5/33

[56] References Cited

U.S. PATENT DOCUMENTS

| | | | |
|---|---|---|---|
| 4,045,816 | 8/1977 | Cave ........................................ | 348/98.8 |
| 4,555,732 | 11/1985 | Tuhro ...................................... | 358/213 |
| 4,694,334 | 9/1987 | Bucher et al. ........................... | 358/113 |
| 5,132,801 | 7/1992 | Yamano .................................. | 348/245 |
| 5,291,293 | 3/1994 | Kapan ..................................... | 348/246 |
| 5,473,660 | 12/1995 | Bastiaens et al. ...................... | 378/98.8 |
| 5,748,803 | 5/1998 | Schielke ................................. | 348/246 |

FOREIGN PATENT DOCUMENTS 2-174381  7/1990  Japan .
3-10473   1/1991  Japan .

*Primary Examiner*—Tommy P. Chin
*Assistant Examiner*—Tung Vo
*Attorney, Agent, or Firm*—Young & Thompson

[57] ABSTRACT

A heat-sensitive infrared-light image sensor is provided with an array of reference cells and video cells. During a setup (initialization) mode, video offset values are produced as representative of deviations of video samples from the video cells and stored in a memory. First reference offset values are produced as representative of deviations of reference samples from the reference cells and a first average value representing an average of the first reference offset values is derived and stored into a first register. During an operational mode, second reference offset values are produced as representative of deviations of reference samples from the reference cells, and a second average value representing an average of the second reference offset values is derived and stored into a second register. The first and second average values are read from the first and second registers and an amount of drift of operational characteristics of the image sensor from initial characteristics of the image sensor is determined from the read average values. The video offset values are read from the memory and modified with the determined amount of drift. Temperature-dependent drift components of video samples from the video cells are canceled out with the modified video offset values.

26 Claims, 4 Drawing Sheets

114 ically identical to the corresponding values of the setup mode, the drift corrector 113 produces outputs of zero value. Each of the video samples applied to the subtractor 132 is cancelled by the offset value supplied from the D/A converter 133 as the address generator 134 scans the memory 131 in synchronism with the image sensor 100. As a result, the output of the FPN corrector 111 has its fixed pattern noise component totally removed.

HEAT-SENSITIVE INFRARED-LIGHT IMAGE SENSOR WITH CIRCUITRY FOR CANCELING TEMPERATURE-DEPENDENT DRIFT COMPONENTS

BACKGROUND OF THE INVENTION

1. Field of the Invention

The present invention relates generally to infrared-light sensors and more specifically to a heat-sensitive infrared-light image sensor formed by an array of infrared-light sensitive cells where the individual output levels of the cells tend to vary with temperature. The present invention is concerned with an apparatus and method for compensating for the temperature-dependent drift components of the individual cells of the image sensor.

2. Description of the Related Art

Infrared-light image sensors of the heat-sensitive type comprise a matrix array of infrared-light cells each being formed by a switching transistor and a thermoelectrical conversion element fabricated in a bolometer structure using titanium. The cells are scanned to produce a video signal as a sequence of video samples. Because of the inherent thermal sensitivity, the intensity of each video sample varies with the temperature of the device and this temperature increases with time in such a manner that a device temperature variation of 1° C., for example, corresponds to a 500° C. temperature variation on the surface of a radiant object. In addition, there exists sensitivity variability due to varying thermal coefficients and varying resistance values from cell to cell. Such variability is known as fixed pattern noise (FPN) and can be easily canceled by DC-level offsets obtained from the image sensor when it is maintained at a predetermined low temperature and shielded from radiation. However, due to the temperature-related variation of the heat-sensitive image sensor, the DC-level offset values are not valid for canceling the variability when the image sensor is in actual use.

SUMMARY OF THE INVENTION

It is therefore an object of the present invention to cancel the temperature-dependent drip components of a hear-sensitive infrared-light image sensor.

According to the present invention, there is a provided a heat-sensitive infrared-light image sensor having a plurality of reference cells for producing reference samples and a plurality of video cells for producing video samples. The stated object is achieved by producing video offset values representative of deviations of the video samples produced during a setup mode and storing the video offset values in a memory. First reference offset values representative of deviations of the reference samples produced during the setup mode are produced and a first average value representing an average of the first reference offset values is derived and stored into a first register. During an operational mode, second reference offset values representative of deviations of the reference samples are produced, and a second average value representing an average of the second reference offset values is derived and stored into a second register. The first and second average values are read from the first and second registers and an amount of drift of operational characteristics of die image sensor from initial characteristics of the image sensor is determined from the read average values. The video offset values are read from the memory and modified with the determined amount of drift. Temperature-dependent drift components of the video samples produced during the operational mode are canceled out with the modified video offset values.

BRIEF DESCRIPTION OF THE DRAWINGS

The present invention will be described in further detail with reference to the accompanying drawings, in which.

DETAILED DESCRIPTION

Figure 1:
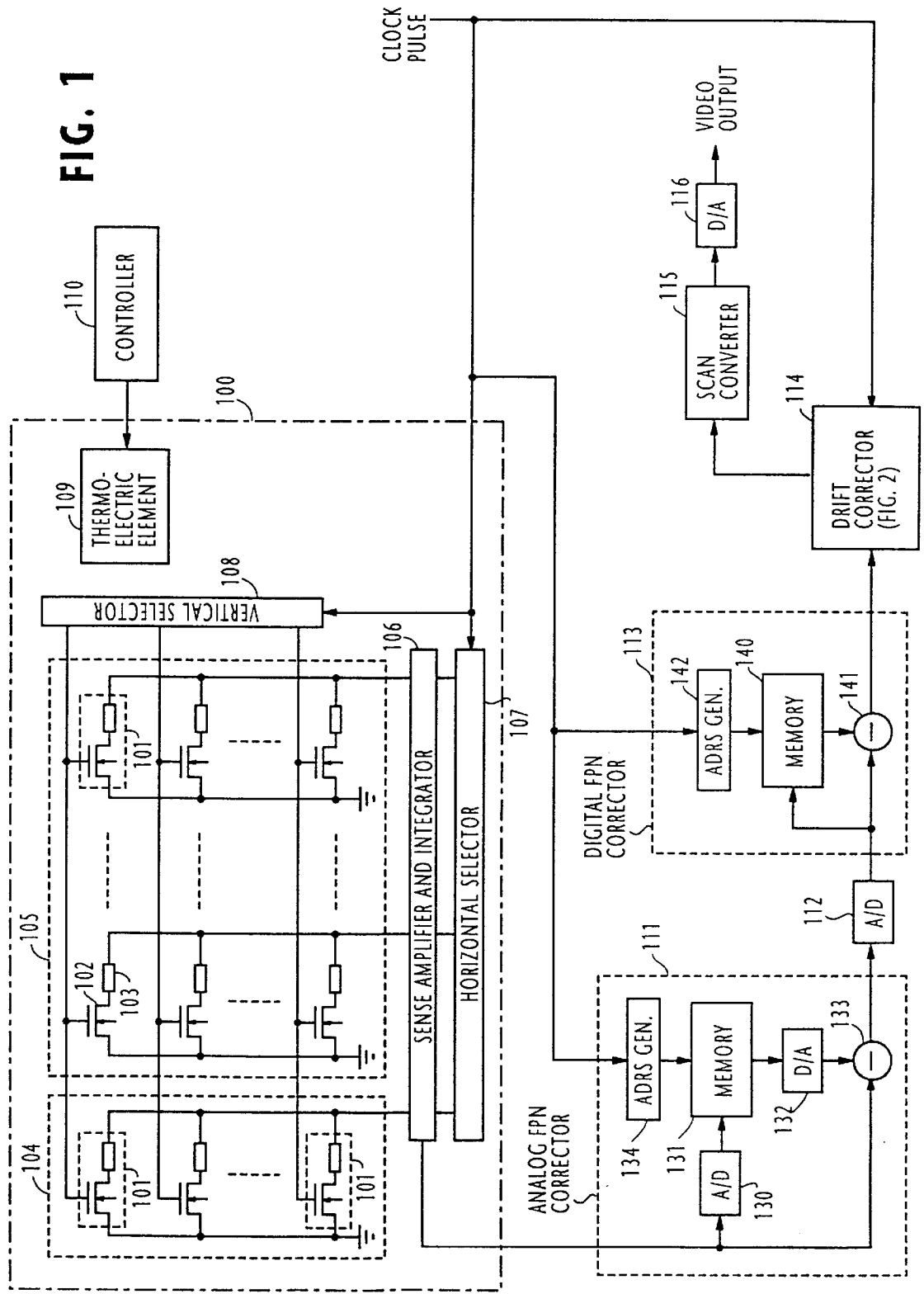
FIG. 1 is a block diagram of an infrared-light imaging apparatus of the present invention.

In FIG. 1, there is shown a heat-sensitive infrared light imaging apparatus according to the present invention. The apparatus includes a two-dimensional thermoelectrical image sensor 100 having a matrix array of thermoelectrical cells 101 each being formed by an n-channel field effect transistor 102 and a thermoelectrical element 103 which is microscopically fabricated in a bolometer structure using titanium. The drain electrodes of the transistors 102 that are arranged in column direction are connected to ground and their source electrodes are connected in series with the thermoelectric element 103 to a sense amplifier and integrator 106 and thence to a horizontal selector 107. The gate electrodes of transistors 102 which are arranged in row direction are connected together to a vertical selector 108. Both horizontal and vertical selectors 107, 108 are driven by a clock pulse to sequentially select column arrays of cells while a given row of cells is selected. All transistors and thermoelectric elements are of identical construction. However, despite their identical construction, the thermoelectric characteristic of the image sensor may differ from one cell to another due to manufacturing tolerances.

In a typical example, the matrix cell array consists of 128 rows and 128 columns. The cells in the leftmost column of the array (i.e., the first column in the order of horizontal scan) are optically shielded from the outside to prevent exposure to radiation so that they serve as reference cells. These reference cells are designated by numeral 104 and produce "reference samples". The remainder cells are light sensitive and designated by numeral 105 and produce "video samples". A thermoelectric (Peltier) element 109 is provided on the image sensor 100 to control its temperature at a predetermined level in response to a signal from a controller 110.

When the transistor of each cell is rendered conductive, a current flow through the corresponding thermoelectric element corresponding to incident infrared light. The current from each conductive cell is amplified and time-averaged by the sense amplifier and integrator 106 and delivered in sequence to an analog FPN corrector 111.

As shown in FIG. 1, the FPN corrector 111 includes an analog-to-digital converter 130, a frame memory 131, a digital-to-analog converter 131 and a subtractor 132. Frame memory 131 has 128×128 storage locations corresponding to the cells of the image sensor 100.

During a setup (initialization) mode of the apparatus, the image sensor 100 is maintained at a predetermined low temperature $t_1$, and all the cells of image sensor 100 are completely shielded from ambient infrared-light radiation and driven by the clock pulse to produce DC-level samples which represent the individual offset values of the cells 101. The DC-level samples from the image sensor are passed through the A/D converter 130 to the memory 131 and pre-stored in the respective storage locations of the memory under control of an address generator 134. These DC-level samples indicate low-temperature offset values of the individual cells of the image sensor 100. The pre-stored offset values are then read out of memory 131 through D/A converter 132 to subtractor 133 where they are subtracted from the DC-level samples from the image sensor 100. The output of subtractor 133 is applied through an A/D converter 112 to a digital FPN corrector 113, which will be used if the offsets of the cells are of significant value. Digital FPN corrector 113 includes a frame memory 140 and a subtractor 141. With the image sensor 100 being maintained at temperature $t_1$, the residual DC-level offset values from subtractor 133 are stored into memory 140 under control of an address generator 142.

During the setup (initialization) mode of the apparatus that is continued for initializing a drift corrector 114 to be described, the temperature of the image sensor is raised and maintained at a higher predetermined level $t_2$. The memory 131 is switched to read mode for sequentially reading the pre-stored DC-level offset values through the D/A converter 132 to the subtractor 133 where the low-temperature offset values are subtracted from the samples produced by image sensor 100 maintained at temperature $t_2$. The output of subtractor 133 is converted to digital form by A/D converter 112 and supplied to subtractor 141. On the other hand, the residual low-temperature offset values are read our of memory 140 into subtractor 141 where they are subtracted from the output of A/D converter 112.

The output of FPN corrector 113 is applied to the drift corrector 114, the output of which is connected to a scan converter 115 where the timing of the video signal from the image sensor is matched to the timing of a standard television signal format. The output of scan converter 115 is converted to analog form by a D/A converter 116 and supplied as a corrected video signal to an external utilization circuitry, not shown.

Since the image sensor 100 is maintained at higher temperature $t_2$, during the setup mode, the video signal from the image sensor contains greater DC-offset values than those obtained at the low temperature $t_1$. These differential offset values occur as a result of the temperature-dependent drift characteristics of the thermal image sensor 100. In order to remove the differential offset values, the output of digital FPN corrector 113 is supplied to the drift corrector 114 where the differential offset values are detected and stored in a memory.

Figure 2:
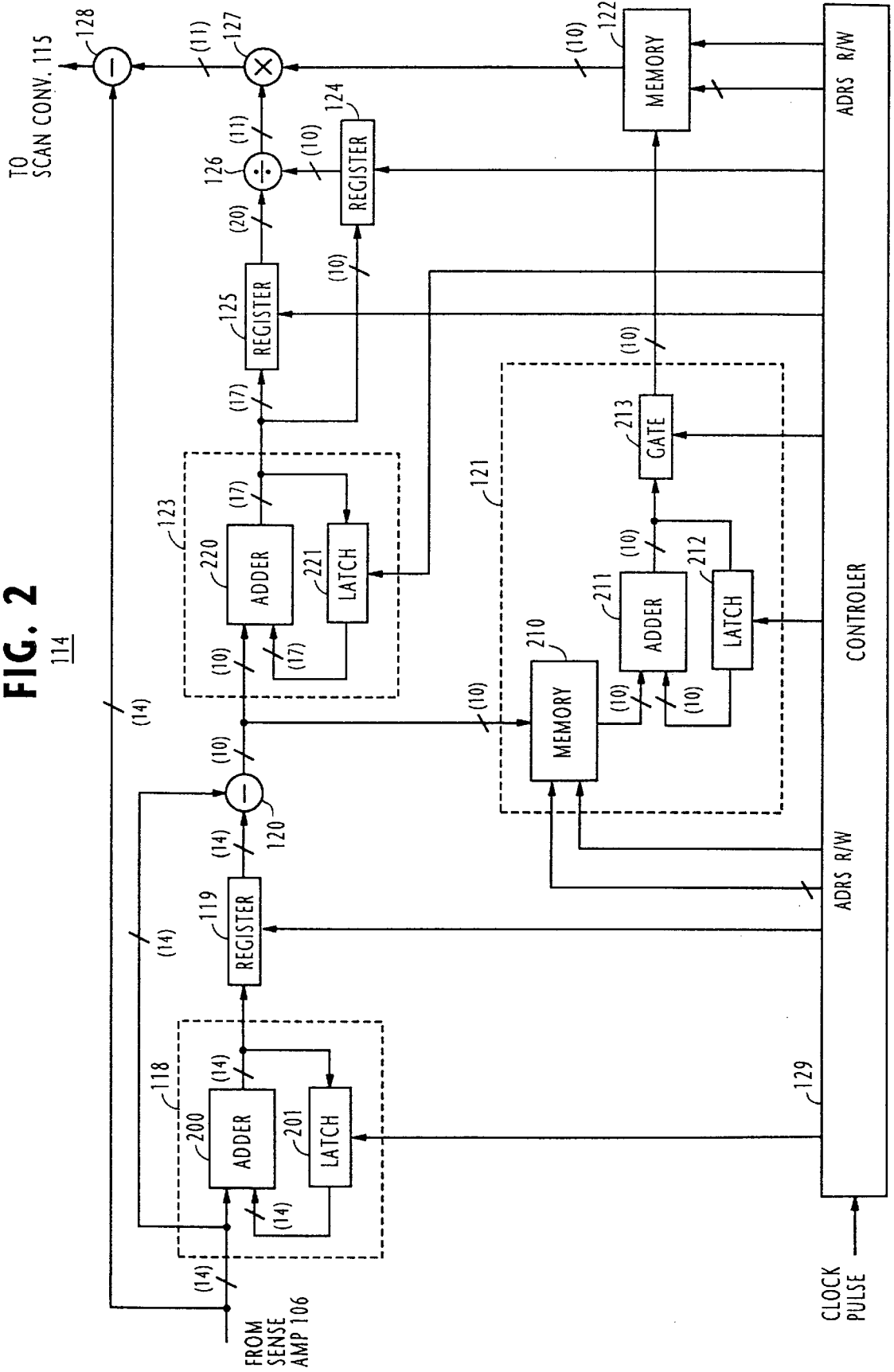
FIG. 2 is a block diagram of the drift corrector of FIG. 1.
Figure 3:
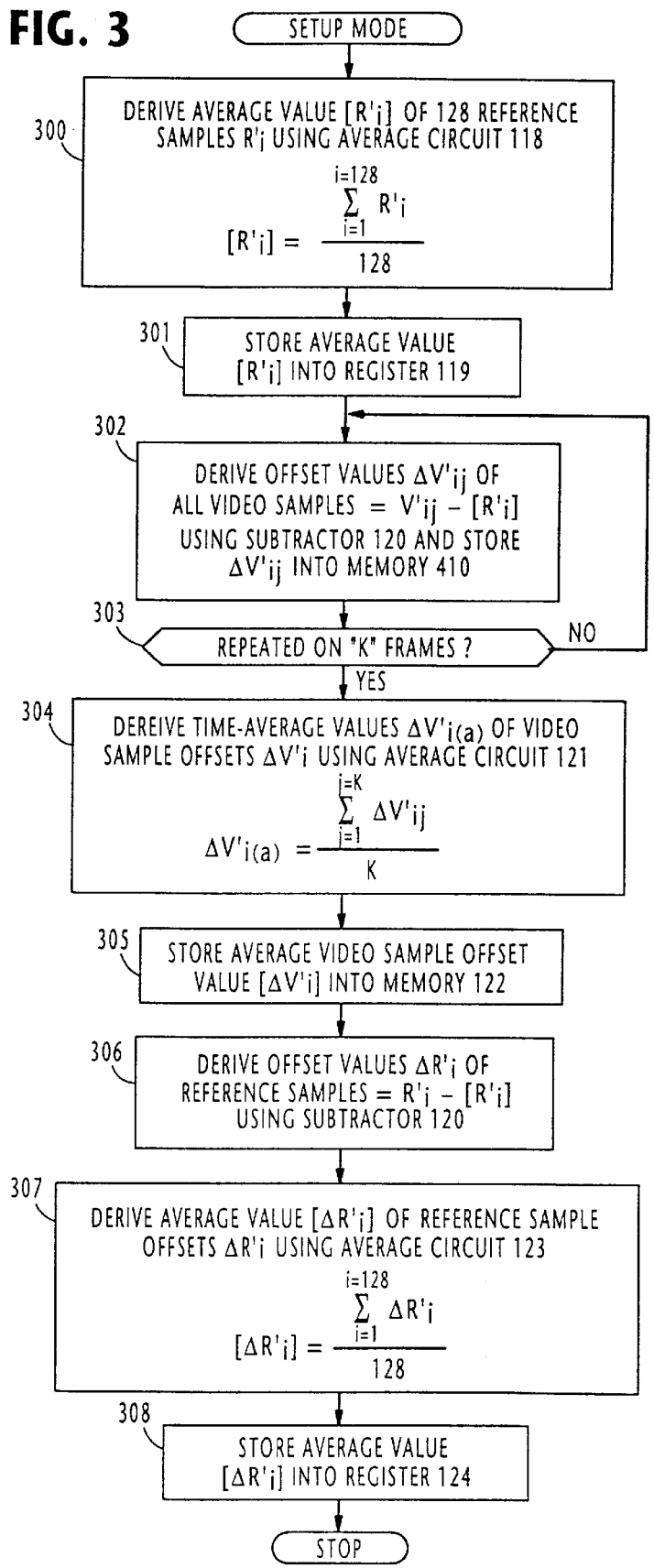
FIG. 3 is a flowchart of a setup mode of the apparatus.
Figure 4:
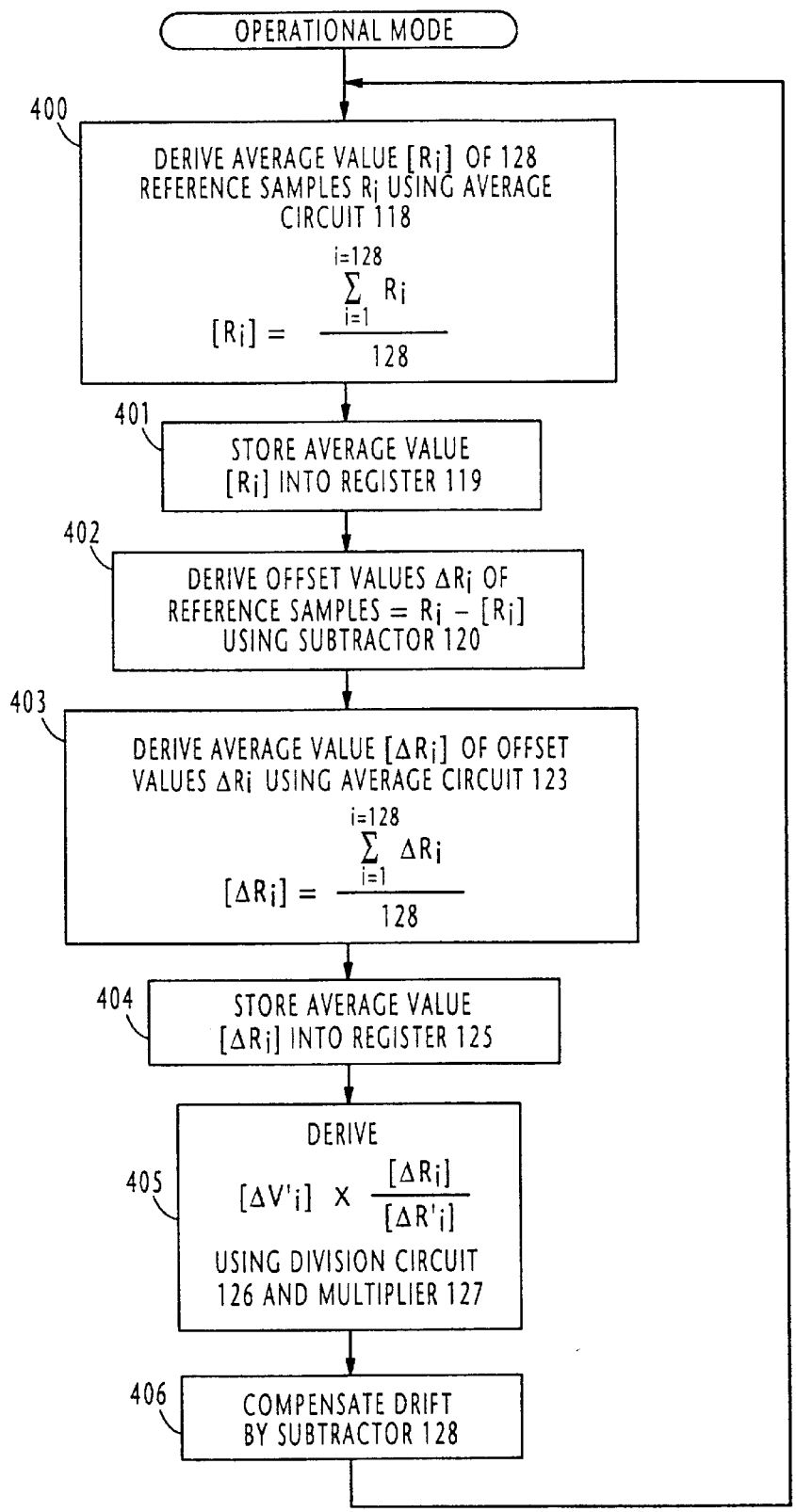
FIG. 4 is a flowchart of an operational mode of the apparatus.

A detailed description of the drift corrector 114 will be given below with reference to the block diagram of FIG. 2 and the flowcharts of FIGS. 3 and 4.

During the setup mode (FIG. 3), all the cells of image sensor 100 are completely shielded from ambient infrared-light radiation as described above and the image sensor 100 is driven by the clock pulse to scan all the cells 101 to produce initial reference samples $R'_i$ and initial video samples $V'_i$. The image sensor is maintained at higher temperature $t_2$ as described. Initially, at step 300, an average value of 14-bit reference samples from digital FPN corrector 113 is determined in the average circuit 118, which is implemented by an integrator formed by an adder 200 and a latch 201. Controller 129 supplies a latch enable pulse when a 14-bit reference sample is received from each one of the reference cells 104. The FPN-compensated reference samples from the corrector 113 are sequentially integrated by adder 200 with a 14-bit output of latch 201 to produce an output representing a sum of "128" reference samples $R'_i$ when the vertical scan reaches the bottom cell of the leftmost column in a given frame scan. The sum of the reference samples $R'_i$ is binary-represented by 21 bits. By discarding the lower 7 bits, an arithmetic division of the sum by integer 128 ($=2^7$) is equivalently performed, producing a 14-bit output from adder 200 as an average value $[R'_i]$ of the initial reference samples $R'_i$. At the same time, controller 129 enables the register 119 to store the average value $[R'_i]$ (step 301). In a subsequent frame scan, differences between all video samples $V'_i$ and the average value $[R'_i]$ are detected by subtractor 120, producing 10-bit samples.

The output of subtractor 120 is applied to a memory 122, preferably via a time-average circuit 121. The initial video offset values $\Delta V'_i$ from subtractor 120 are stored in respective locations of a memory 210 of the average circuit 121 specified by controller 129. This operation, as represented by step 302, is repeated on "K" frames (step 303). Therefore, offset values $\Delta V'_{ij}$ (where j=1, 2, ..., K) of "K" frames are stored in memory 210. These offset values are sequentially read from memory 210 into an integrator formed by an adder 211 and a latch 212. As a result, the 10-bit offset values $\Delta V'_{i1}, \Delta V'_{i2}, \ldots, \Delta V'_{iK}$ are summed, giving a total value of K successive samples for each video cell. If K is 4, the total value will be represented by a 12-bit value and the lower 2-bit data is discarded, giving a 10-bit output representing a time-average value $\Delta V'_{i(a)}$ of the 10-bit offset components $\Delta V'_{i1}, \Delta V'_{i2}, \Delta V'_{i3}$ and $\Delta V'_{i4}$ (step 304). The time-averaged values of video-sample offsets are passed through a gate 213 and stored in respective locations of the memory 122 (step 305) addressed by controller 129. The time-averaging operation during "K" frames has the effect of smoothing to an insignificant level the random noise which may erratically occur in a frame scan.

During a subsequent frame, 10-bit offset values $\Delta R'_i$ of reference samples are subsequently derived from subtractor 120 by taking differences of absolute value between reference samples $R'_i$ and the average value $[R'_i]$ stored in register 119 (step 306). A 10-bit offset values $\Delta R'_i$ of reference samples are derived from subtractor 120 by raking differences between reference samples $R'_i$ and the average value $[R'_i]$ stored in register 119 (step 306). At step 307, an average value $[\Delta R'_i]$ of offset values $\Delta R'_i$ is derived by the average circuit 123 which comprises a 17-bit adder 220 and a latch 221. Adder 220 and latch 221 constitute an integrator to produce a 17-bit output representing a total sum of offset values $\Delta R'_i$. Since the input coefficient is represented by 10 bits and the number of the coefficients is 128, their total sum is represented by 17 bits. A 10-bit average value $[\Delta R'_i]$ of reference offsets $\Delta R'_i$ is produced by discarding the lower 7 bits, thus providing, in effect, a division of the total sum of the reference offset values $\Delta R'_i$ by integer 128 (step 307). The 10-bit average value $[\Delta R'_i]$ is then stored into the register 124 (step 308).

With the video-sample offset values $\Delta V'_{i(a)}$ being stored in memory 122 and the initial reference-sample offset value $[\Delta R'_i]$ being stored in register 124, the setup mode is terminated. This setup mode is usually performed prior to shipment of the apparatus to users.

During the normal operation of the infrared-light imaging apparatus, the image sensor 100 is illuminated with infrared-light radiation so that the temperature of the image sensor increases with time from ambient temperature. The image sensor is driven by the same clock pulse as used during the setup mode to produce operational reference samples $R_i$ and operational video samples $V_i$. In the operational mode, a frame scan starts with step 400 in FIG. 4 in which an average value of 128 reference samples $R_i$ is obtained from the output of digital FPN corrector 113 by the average circuit 118, producing a 14-bit average value $[R_i]$ which is then stored into register 119 (step 401). Note that, during the operational mode, the drift components of the output of corrector 113 resulting from the temperature variation from $t_1$ to $t_2$ are already canceled, yet there remain the drift components arising from variation from temperature $t_2$ to the current value.

Ten-bit offset values $\Delta R_i$ of operational reference samples are subsequently derived from subtractor 120 by taking differences between samples $R_i$ and the average value $[R_i]$ stored in register 119 (step 402).

At step 403, a total sum of reference-sample offset values $\Delta R_i$ is produced by adder 220. This total sum is represented by 17 bits. In mathematical terms, this total sum must be divided by integer 128 to derive an average value. However, since a digital division process will be performed later by the division circuit 126, it is convenient for practical purposes to multiply, rather than divide, the total sum of offset values $\Delta R_i$ by integer 128. This indicates that the 17-bit output of adder 220 is used without modifying its calculated bit positions. The 17-bit output of adder 220 is then stored into the register 125 as an average value $[\Delta R_i]$ of reference-sample offsets $\Delta R_i$ (step 404).

At step 405, the outputs of registers 124 and 125 are supplied to the division circuit 126 as a divisor and a dividend, respectively, to produce a ratio therebetween. Although the data stored in register 125 is of a 17-bit value, it is shifted upward by three bit positions, giving a 20-bit input to the division circuit 126. Therefore, the average value of reference offset values $\Delta R_i$ at the 20-bit input of division circuit 126 is 1,024 (=128×8) times greater in value than the theoretical average value. Therefore, if the divisor is equal to the dividend, the division circuit 126 will produce an 11-bit output ("10000000000") representing a decimal value 1,024.

The output of division circuit 126 indicates the amount of drift of the operational thermal characteristic of the image sensor 100 from that measured at temperature $t_2$ during the setup mode. The 10-bit initial video-sample offset values $\Delta V'_{i(a)}$ are sequentially read out of memory 122 by controller 129 and multiplied by the 11-bit output of division circuit 126 in the multiplier 127. Although the mathematical value of the multiplication results in a 21-bit output, the higher 11 bits are used as significant bits by discarding the lower 10 bits. This is equivalent to an arithmetic division of the 21 bits by a decimal number 1,024, thereby compensating for the multiplication by the decimal number 1,024 as previously described.

The output of multiplier 127 is applied to a subtractor 128 during a subsequent frame where the multiplied video offset values $V'_i$ are subtracted from the output of digital FPN corrector 113 to compensate for the temperature-related, differential drift components of the image sensor 100 that occur as a result of temperature shift from $t_2$ to the current temperature (step 406). The above process is repeated during each successive frame, so that the content of register 125 is updated according to the varying device temperature and the temperature-related drift components of the image sensor are adaptively corrected.

What is claimed is:

1. An infrared-light imaging apparatus comprising:
    a thermoelectrical image sensor having a plurality of reference cells for producing reference samples and a plurality of video cells for producing video samples; and
    offset correction circuitry for performing the functions of:
        producing first reference offset values of the reference samples produced during a setup mode, second reference offset values of the reference samples produced during an operational mode, and video offset values of the video samples produced during the setup mode and storing the video offset values in a memory;
        producing a first average value representing an average of said first reference offset values and storing said first average value in a first register and producing a second average value representing an average of said second reference offset values and storing the second average value in a second register;
        reading the first and second average values from the first and second registers and determining, from the read average values, an amount of drift of operational characteristics of said image sensor from initial characteristics of the image sensor;
        reading the video offset values from the memory and modifying the read video offset values with said amount of drift to produce modified video offset values; and
        correcting the video samples produced during said operational mode with said modified video offset values.

2. An infrared-light imaging apparatus as claimed in claim 1, wherein said first reference offset values are representative of deviations from said first average value, and said second reference offset values are representative of deviations from said second average value, and wherein said video offset values are representative of deviations from said first average value.

3. An infrared-light imaging apparatus as claimed in claim 1, wherein said image sensor comprises a two-dimensional image sensor in which said reference cells and said video cells are arranged in a matrix array of rows and columns.

4. An infrared-light imaging apparatus as claimed in claim 3, wherein said reference cells are arranged in one of the columns of said matrix array.

5. An infrared-light imaging apparatus as claimed in claim 3, wherein said offset correction circuitry further performs the function of determining time-averaged values of the video offset values of the video samples which are produced by said video cells during a plurality of successive frames of said image sensor before being stored in said memory.

6. An infrared-light imaging apparatus comprising:
    a thermoelectrical image sensor having a plurality of reference cells for producing reference samples and a plurality of video cells for producing video samples;
    first average circuitry for producing a first average value representing an average of the reference samples produced during a setup mode and a second average value representing an average of the reference samples produced during an operational mode;
    first subtraction circuitry for producing first reference offset values of the reference samples produced during the setup mode from said first average value, second reference offset values of the reference samples produced during the operational mode from said second average value, and video offset values of the video samples produced during said setup mode from said first average value;
    a memory for storing said video offset values;
    second average circuitry for deriving a third average value representing an average of said first reference offset values and a fourth average value representing an average of said second reference offset values and storing the third and fourth average values in first and second registers, respectively;

division circuitry for reading the third and fourth average values from said first and second registers and determining a ratio between the read average values;

multiplier circuitry for reading said video offset values from said memory and multiplying the read video offset values by said ratio to produce modified video offset values; and second subtraction circuitry for correcting the video samples produced during said operational mode with said modified video offset values.

7. An infrared-light imaging apparatus as claimed in claim 6, wherein said image sensor comprises a two-dimensional image sensor in which said reference cells and said infrared-light cells are arrange in a matrix array of rows and columns.

8. An infrared-light imaging apparatus as claimed in claim 7, wherein said reference cells are arranged in one of the columns of said matrix array.

9. An infrared-light imaging apparatus comprising:

a thermoelectrical image sensor having a plurality of reference cells for producing reference samples and a plurality of video cells for producing video samples; and offset correction circuitry for performing the functions of:
deriving a first average value representing an average of the reference samples produced during a setup mode, and a second average value representing an average of the reference samples produced during an operational mode;

producing first reference offset values of the reference samples produced during said setup mode from said first average value, second reference offset values of the reference samples produced during the operational mode from said second average value, and video offset values of the video samples produced during the setup mode from said first average value, and storing said video offset values in said memory;

deriving a third average value representing an average of said first reference offset values during said setup mode, storing the third average value in a first register, producing a fourth average value representing an average of said second reference offset values during an operational mode, and storing the fourth average value into a second register;

reading the third and fourth average values from the first and second registers during the operational mode and determining a ratio between the read average values;

reading said video offset values from said memory during said operational mode and multiplying the read video offset values by said ratio to produce modified video offset values; and correcting the video samples produced during said operational mode with said modified video offset values.

10. An infrared-light imaging apparatus as claimed in claim 9, wherein said image sensor comprises a two-dimensional image sensor in which said reference cells and said video cells are arranged in a matrix array of rows and columns.

11. An infrared-light imaging apparatus as claimed in claim 10, wherein said reference cells are arranged in one of the columns of said matrix array.

12. An infrared-light imaging apparatus as claimed in claim 10, wherein said offset correction circuitry further performs the function of determining time-averaged values of the video offset values of the video samples which are produced by said video cells during a plurality of successive frames of said image sensor before being stored in said memory.

13. An infrared-light imaging apparatus comprising:

a thermoelectrical image sensor having a plurality of reference cells for producing reference samples and a plurality of video cells for producing video samples;

a first register storing a first average value representing an average of deviations of the reference samples produced during a setup mode;

a memory storing video offset values of the video samples produced during said setup mode; and offset correction circuitry for performing the functions of:
producing a second average value representing an average of deviations of the reference samples produced during an operational mode and storing the second average value into a second register;

reading said first and second average values from said first and second registers and determining, from the read average values, an amount of drift of operational characteristics of said image sensor from initial characteristics of the image sensor;

reading the video offset values from said memory and modifying the read video offset values with said amount of drift to produce modified video offset values; and correcting video samples produced during said operational mode with said modified video offset values.

14. An infrared-light imaging apparatus as claimed in claim 13, wherein said image sensor comprises a two-dimensional image sensor in which said reference cells and said video cells are arranged in a matrix array of rows and columns.

15. An infrared-light imaging apparatus as claimed in claim 14, wherein said reference cells are arranged in one of the columns of said matrix array.

16. An infrared-light imaging apparatus as claimed in claim 14, wherein said offset correction circuitry further performs the function of determining time-averaged values of the video offset values of the video samples which are produced by said video cells during a plurality of successive frames of said image sensor before being stored in said memory.

17. In a heat-sensitive infrared-light image sensor having a plurality of reference cells that produce reference samples and a plurality of video cells that produce video samples, a method comprising the steps of:

a) producing video offset values representative of deviations of the video samples produced during a setup mode and storing the video offset values in a memory;

b) producing first reference offset values representative of deviations of the reference samples produced during the setup mode, producing a first average value representing an average of said first reference offset values and storing the first average value into a first register;

c) producing second reference offset values representative of deviations of the reference samples produced during an operational mode, producing a second average value representing an average of said second reference offset values and storing the second average value into a second register;

d) reading the first and second average values from said registers and determining, from the read average values, an amount of drift of operational characteristics of said image sensor from initial characteristics of the image sensor;

e) reading the video offset values from said memory and modifying the read video offset values with said amount of drift to produce modified video offset values; and f) correcting the video samples produced during the operational mode with said modified video offset values.

18. A method as claimed in claim 17, wherein said amount of drift is represented by a ratio between said first and second average values.

19. A method as claimed in claim 17, wherein the image sensor is maintained at a predetermined temperature and prevented from being illuminated during said setup mode, and the image sensor is illuminated and the temperature of the image sensor increases with incident radiation from ambient temperature during said operational mode.

20. In a heat-sensitive infrared-light image sensor having a plurality of reference cells that produce reference samples and a plurality of video cells that produce video samples, a method comprising the steps of:

a) producing a first average value representing an average of offset values of the reference samples produced during a setup mode, storing the first average value in a first register, producing video offset values representative of deviations of the video samples produced during the setup mode and storing the video offset values in a memory;

b) producing a second average value representing an average of offset values of the reference samples produced during an operational mode, and storing the second average value in a second register;

c) reading said first and second average values from said registers and determining a ratio between the read average values;

d) reading the video offset values from said memory and multiplying the read video offset values by said ratio to produce modified video offset values; and e) correcting video samples produced during said operational mode with said modified video offset values.

21. A method as claimed in claim 20, wherein the step (a) comprises deriving an average value of the reference samples produced during the setup mode and producing said offset values as representative of deviations of the reference samples from the average value and producing said video offset values as representative of deviations from the average value, and the step (b) comprises deriving an average value of the reference samples produced during the operational mode and producing said offset values as representative of deviations from the average value.

22. A method as claimed in claim 20, wherein the image sensor is maintained at a predetermined temperature and prevented from being illuminated during said setup mode, and the image sensor is illuminated and the temperature of the image sensor increases with incident radiation from ambient temperature during said operational mode.

23. In an infrared-light imaging apparatus comprising:

a thermoelectrical image sensor having a plurality of reference cells for producing reference samples and a plurality of video cells for producing video samples;

a first register storing a first average value representing an average of offset values of the reference samples produced during a setup mode; and a memory storing video offset values of the video samples produced during said setup mode, a method for operating the imaging apparatus comprising the steps of:

producing a second average value representing an average of offset values of the reference samples produced during an operational mode and storing the second average value into a second register;

reading said first and second average values from said first and second registers and determining, from the read average values, an amount of drift of operational characteristics of said image sensor from initial characteristics of the image sensor;

reading the video offset values from said memory and modifying the read video offset values with said amount of drift to produce modified video offset values; and correcting video samples from said video cells with said modified video offset values.

24. A method as claimed in claim 23, wherein the image sensor is maintained at a predetermined temperature and prevented from being illuminated during said setup mode, and the image sensor is illuminated and the temperature of the image sensor increases with incident radiation from ambient temperature during said operational mode.

25. In a heat-sensitive infrared-light image sensor having a plurality of reference cells that produce reference samples and a plurality of video cells that produce video samples, a method comprising the steps of:

a) during a setup mode, maintaining the image sensor at a first temperature and storing the video samples from said image sensor in a first memory as DC-level offset values;

b) maintaining the image sensor at a second temperature higher than the first temperature, reading the DC-level offset values from the first memory and subtracting the read DC-level offset values from the video samples from the image sensor to produce differential video samples indicating a drift from said first temperature to said second temperature;

c) producing video offset values representative of deviations of said differential video samples and storing the video offset values in a second memory;

d) producing first reference offset values representative of deviations of the reference samples produced by the image sensor maintained at the second temperature, producing a first average value representing an average of said first reference offset values and storing the first average value into a first register;

e) during an operational mode, maintaining the image sensor at ambient temperature, producing second reference offset values representative of deviations of the reference samples produced by the image sensor maintained at the ambient temperature, producing a second average value representing an average of said second reference offset values and storing the second average value into a second register;

f) reading the first and second average values from said registers and determining, from the read average values, an amount of drift of operational characteristics of said image sensor from initial characteristics of the image sensor;

g) reading the video offset values from said second memory and modifying the read video offset values with said amount of drift to produce modified video offset values; and h) correcting the video samples supplied from said video cells with said modified video offset values.

26. A method as claimed in claim 25, wherein said amount of drift is represented by a ratio between said first and second average values.

* * * * *